(12) United States Patent
Ward

(10) Patent No.: US 10,637,915 B1
(45) Date of Patent: Apr. 28, 2020

(54) STORAGE SERVICES CONFIGURED FOR STORAGE-ORIENTED APPLICATIONS

(71) Applicant: Amazon Technologies, Inc., Reno, NV (US)

(72) Inventor: Miles Julian Ward, Santa Barbara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 14/210,237

(22) Filed: Mar. 13, 2014

(51) Int. Cl.
*G06F 9/50* (2006.01)
*H04L 29/08* (2006.01)

(52) U.S. Cl.
CPC .............................. *H04L 67/1008* (2013.01)

(58) Field of Classification Search
CPC ............. H04L 41/5025; H04L 67/1008; G06F 9/5072; G06F 2209/508
See application file for complete search history.

(56) References Cited

U.S. PATENT DOCUMENTS

| | | | | |
|---|---|---|---|---|
| 9,602,344 | B1* | 3/2017 | Iyengar | H04L 41/0813 |
| 9,893,953 | B1* | 2/2018 | Castelli | H04L 41/145 |
| 2004/0015723 | A1* | 1/2004 | Pham | H04L 63/10 726/27 |
| 2009/0063563 | A1* | 3/2009 | Khangaonkar | G06F 17/30557 |
| 2012/0054248 | A1* | 3/2012 | Mehrotra | G06F 16/25 707/803 |
| 2012/0066337 | A1* | 3/2012 | Wu | G06F 3/0605 709/214 |
| 2012/0331113 | A1* | 12/2012 | Jain | G06F 9/5072 709/220 |
| 2013/0111034 | A1* | 5/2013 | Upadhya | G06F 3/0605 709/226 |
| 2013/0332697 | A1* | 12/2013 | Hiwatashi | G06F 3/0607 711/173 |
| 2014/0068053 | A1* | 3/2014 | Ravi | G06F 9/5072 709/224 |
| 2014/0156877 | A1* | 6/2014 | Tylik | G06F 3/0605 710/18 |

OTHER PUBLICATIONS

Ward, Miles. "NoSQL Databases in the Cloud: MongoDB on AWS," Amazon Web Services, Mar. 2013, 21 pages.

* cited by examiner

*Primary Examiner* — Soe Hlaing
(74) *Attorney, Agent, or Firm* — Hogan Lovells US LLP

(57) ABSTRACT

The subject technology provides for receiving, via an application programming interface (API), a request from a client, the request including software configuration data for configuring data storage for supporting a workload of an application. A set of hardware performance characteristics for supporting the workload of the application is determined based at least in part on the software configuration data that includes a name of a respective software application and/or version of the software application. The subject technology determines a current set of available hardware resources that match the set of hardware performance characteristics. Using the current set of available hardware resources, a set of data stores are provisioned. The subject technology then provides, to the client, information related to a virtual mount point for provisioning the set of data stores to the application.

20 Claims, 8 Drawing Sheets

STORAGE SERVICES CONFIGURED FOR STORAGE-ORIENTED APPLICATIONS

BACKGROUND

Applications including software services and Web services provide a way to access software functionality that can be reused for a variety of purposes by different clients. Services are usually provided by a server or other entity and are accessed by clients remotely over a network connection, such as a local area network (LAN), a wide area network (WAN), the Internet, etc. Further, a service may provide an application programming interface (API) that can be used by users to access functionality provided by the service.

There are numerous distinct software applications that run on compute, storage, and network infrastructure that may be offered by a service provider(s). A few of these, such as a relational database management system, NoSQL system, or direct network file system, may be dependent on storage to provide functionality. There is variety in the configurations of storage that are used to deliver high-performance, consistency, and high-availability around storage-bound workloads. However, there is confusion on the best practice for optimized implementations, and many generic product offerings end up being mismatched to the specific needs of a storage application.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments overcome the aforementioned and other deficiencies in existing approaches for configuration of storage to satisfy an application workload of a given application. In particular, various embodiments may provide an application optimized storage service system, which accepts input (e.g., in the form of a request) from a storage-oriented application vendor (e.g., a client) and defines the performance characteristics that the application may require for optimal performance and efficiency, or at least performance characteristics that provide improved performance over general performance characteristics. Typically, the application vendor is not knowledgeable with respect to specific hardware requirements that are needed to provide a specific type of storage for the application, but may know specific software requirements that enable the application to execute in an optimal manner. Thus, the request may include computing or other requirements that are expressed in terms of software measurements but are not related to hardware specification(s) of a specific resource, such as a given data store.

The subject technology may respond to this request by converting or translating the computing requirements of the application, defined in terms of software workload measures, into hardware specific performance characteristics to determine a configuration of one or more data stores (e.g., from a set of distributed storage systems), or group or cluster of data storage resources, that satisfy the computing requirements of the application.

To select, configure, and/or launch data stores (or data store instances) appropriate for a request, the subject technology may utilize different measurements of performance characteristics that may include, for example: I/O block size, multi-block I/O aggregated operation size, write/read I/O ratio, write/read throughput ratio, ratio of throughput to I/O, ratio of capacity to I/O, throughput, level of internal redundancy, level of integrated write or read cache, etc. As a response to the request, the subject technology may generate a configuration of a physical storage system, including a set of one or more data stores, that may be efficient to provision, and ensures an efficient allocation of storage to serve the defined workload of the application.

Figure 1:
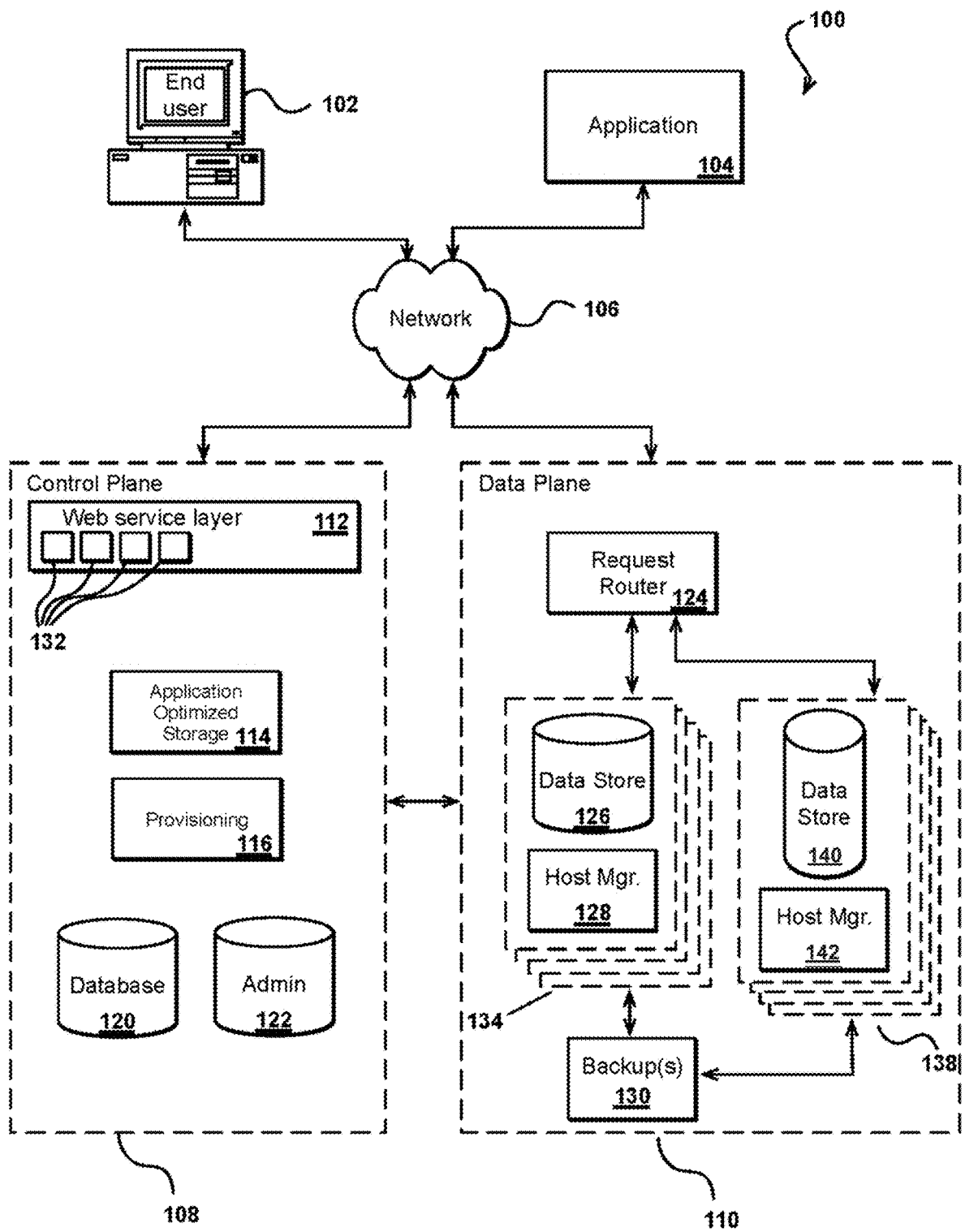
FIG. 1 illustrates an environment in which various embodiments can be implemented, in accordance with various embodiments.

FIG. 1 illustrates an example of an electronic resource environment 100 that can be used in accordance with various embodiments. In this example, a computing device 102 for an end user is shown to be able to make calls through at least one network 106 (e.g., the Internet, a cellular network, a wireless network, a local area network (LAN), etc.) into a control plane 108 to perform a task such as to provision a data repository or launch a virtual machine in a data plane 110. The user or an application 104, for example, can access the repository and/or virtual machine directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. In various embodiments, a web service may receive an API call to create a new storage type based on performance characteristics of an application workload for a given application. In particular, the API call, as described further herein, may be in a form of a request including software configuration data for configuring data storage for supporting a workload of an application. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration (Admin) data store 122, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store 122, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "application optimized storage" component 114. A application optimized storage component 114 can be any appropriate component operable to determine a set of hardware performance characteristics for supporting the workload of the application based on software configuration data. In some embodiments, the application optimized storage component 114 may pass information, such as the hardware performance characteristics, to a database 120, which may be queried by a provisioning component 116 to provision one or more data stores for supporting the application workload of an application. The application optimized storage component 114 and/or the provisioning component 116 can receive information to determine active VMs, resource VMs, data stores or other such resources or components 134 in the data plane 110.

Each resource VM 134 in the data plane can include at least one data store 126 or data store 140 and a host manager component 128 for the machine providing access to the data store. In one embodiment, the data store 126 and the data store 140 may correspond to different types of data stores, such as those for respective types of databases, each with respective performance characteristics. A host manager in one embodiment is an application or software agent executing on a VM and/or application server, such as a Tomcat or Java application server, programmed to manage tasks such as software deployment and data store operations, as well as monitoring a state of the data store and/or the respective VM. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the VMs for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

Once a VM is provisioned and a user is provided with a DNS address or other address or location, the user can send requests "directly" to the data plane 110 through the network using a Java Database Connectivity (JDBC) or other such client to directly interact with that VM 134. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as VM or availability failures, for example, can be masked by programmatically remapping a DNS address to any appropriate replacement VM for a use. A request received from a user 102 or application 104, for example, can be directed to a request router 124, or other appropriate component, which can direct the request to the actual VM 134 or host corresponding to the request. As discussed, such an approach allows for VMs to be dynamically moved, updated, replicated, etc., without requiring the user or application to change the DNS or other address used to access the VM. As discussed, each VM 134 can include a host manager 128 and a data store 126, for example, and can have at least one backup VM or copy in persistent storage 130. Similarly, each VM 138 can include a host manager 142 and a data store 140 and can have at least one backup VM or copy in persistent storage 130. Using such an approach, once the VM has been configured through the control plane, a user, application, service, or component can interact with the VM directly through requests to the data plane, without having to access the control plane 108. For example, the user can directly issue SQL or other such commands relating to the data in the VM through the DNS address. The user would only have to access the control plane if the user wants to perform a task such as expanding the storage capacity of an VM. In at least one embodiment, the functionality of the control plane 108 can be offered as at least one service by a provider that may or may not be related to a provider of the data plane 110, but may simply be a third-party service that can be used to provision and manage data VMs in the data plane, and can also monitor and ensure availability of those VMs in a separate data plane 110.

Figure 2:
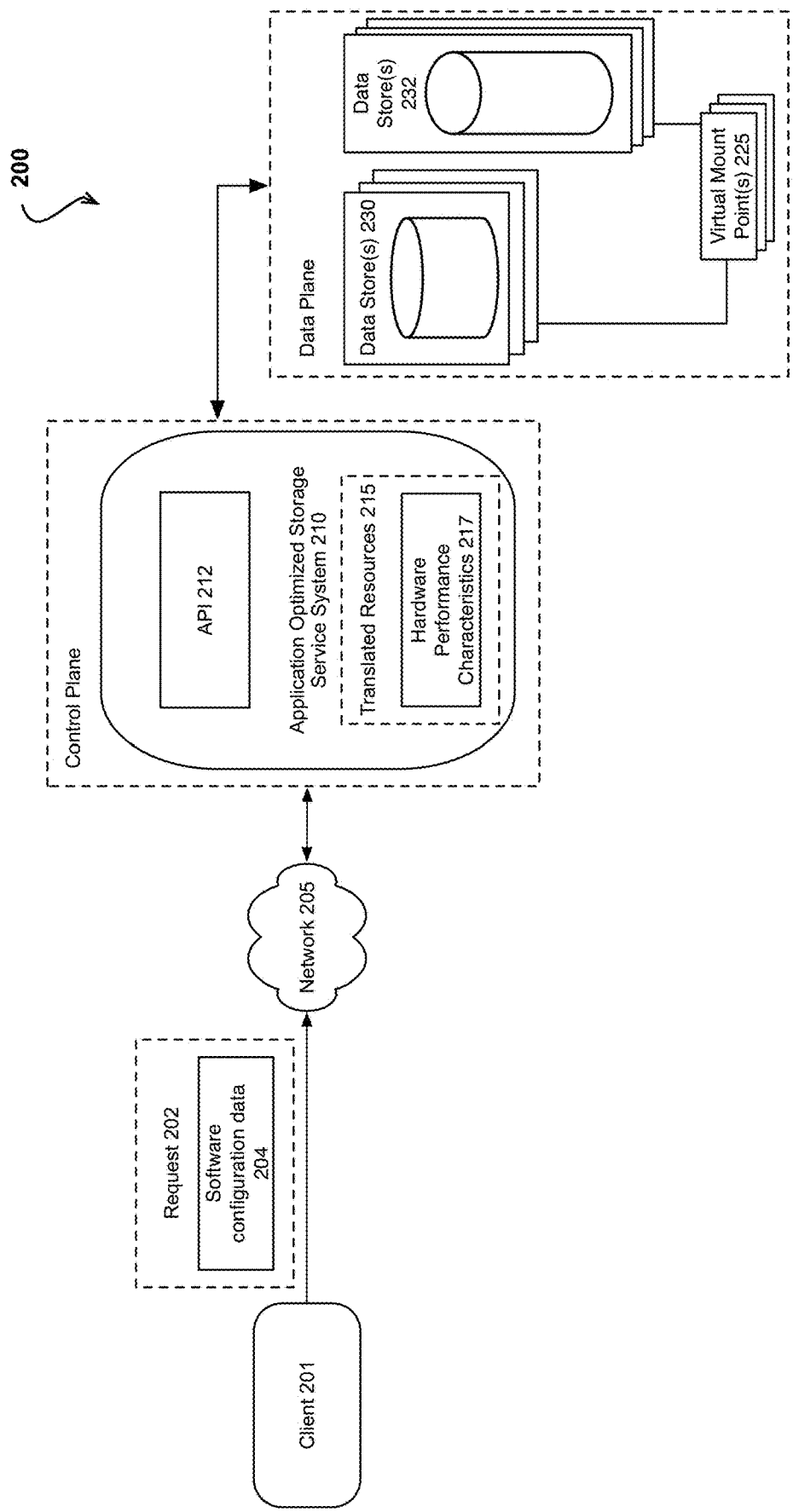
FIG. 2 illustrates an example of a possible deployment of an application optimized storage service system in accordance with various embodiments.

FIG. 2 illustrates an example of a possible deployment 200 of an application optimized storage service system in accordance with various embodiments. As illustrated, a client 201, such an as application vendor or provider, may send a request 202 including software configuration data 204 for configuring data storage for supporting a workload of an application. The software configuration data 204 may include a name and/or version number of an application, or a set of computing resource requirements that describes or defines an application workload of a given application. For example, the name of the application may refer to a respective type of application (e.g., a database, etc.) that includes a respective set of performance characteristics in which performance characteristics may differ according to the version number of the application. Further, the software configuration data may include a machine identifier to a particular computing device, name or model of a physical computing device, physical characteristics associated with the name or model of the physical computing device, a uniform resource locator to a respective software application (e.g., as included in a script or file with information regarding the software application), information including benchmark results of a respective physical computing device (e.g., log files including performance information based on such benchmark results for the respective physical computing device). The set of computing resource requirements may include information that indicates a number of operations over a period of time, an amount of latency per operation or an amount of storage space required for optimal performance and efficiency while executing the application or at least performance characteristics that provide improved performance over general performance characteristics. It is appreciated that other types of computing resource requirements may be included according to the specific needs of the application and still be within the scope of the subject technology. Other computing resource requirements of the application may include, for example, a number of files that are sent over a network during a period of time, or handling a number of requests from users of the application over a period of time, etc.

The request 202 is sent over a network 205 (e.g., LAN, WLAN, the Internet, etc.) to an application optimized storage service system 210, which may be included in a control plane (e.g., as described in FIG. 1). The application optimized storage service system 210 may expose or provide an application programming interface (API) 212 that enables the client 201 to access functionality related to provisioning storage resources for the application. In response to receiving the request 202, the application optimized storage service system 210 may convert the software configuration data 204 included in the request 202 to a set of hardware performance characteristics 217 to support the application workload. As illustrated, the hardware performance characteristics 217 may be included with (or stored within) a data structure corresponding to translated resources 215. Converting the software configuration data 204 may include determining a set of hardware requirements corresponding to computing resource requirements that support the application workload. Each hardware requirement may represent a performance or physical characteristic of a physical storage device (e.g., hard disk, solid state disk, etc.) required by at least one computing resource requirement of the software configuration data.

It is appreciated that storage resources, such as one or more physical storage devices included in a storage cluster(s), provided by a service provider may currently be provisioned to other clients or applications resulting in not all storage resources being available to provision to the application. Thus, the application optimized storage service system 210 may determine a current set of available hardware resources from a given storage cluster that includes one or more physical storage devices that match the set of hardware performance characteristics. Each physical storage device may have a respective set of hardware performance characteristics based on available hardware resources. In the context of physical storage devices, such hardware performance characteristics may include performance measurements such as (but not limited to) an interface speed, access latency, access time, seek time, input/output (I/O) block size, multi-block I/O aggregated operation size, write/read I/O ratio, write/read throughput ratio, ratio of throughput to I/O, ratio of capacity to I/O, throughput, level of internal redundancy, expected ratio of sequential to random operation and level of integrated write or read cache, etc. Other hardware performance characteristics may be used and still be within the scope of the subject technology.

Determining the current set of available hardware resources that match the set of hardware performance characteristics may be accomplished by measuring hardware performance characteristics based on available hardware resources of each physical storage device. In one example, given a computing requirement of the application being a predetermined X amount of storage space, if a first physical storage device has (X-n) available storage space and a second physical storage device has (n+y) available storage, the application optimized storage service system 210 may select the first and second physical storage devices to satisfy the requirement of having X amount of storage space for the application. In another example, given a computing requirement of the application being performing a Z number of operations per second, if it is determined that a Z (e.g., 10) number of physical storage devices each has available resources to perform (Z-(Z-1)) number of operations per second (e.g., (10-(10-1))) operations per second, the application optimized storage service system 210 may select each of the Z number of physical storage devices to satisfy the required application workload. It is understood that other ways to select the set of physical storage devices may be implemented based on the specific resource needs of the application. Further, different ways to measure the hardware performance characteristics based on available hardware resources of each physical storage device are may be utilized.

Using the current set of available hardware resources, the application optimized storage service system 210 provisions or launches a set of data stores 230 (e.g., included in a data plane) for supporting the workload of the application. The set of data stores 230 that are provisioned therefore match the hardware performance characteristics that support the application workload in some embodiments. As further shown, the data plane may include a set of data stores 232 that correspond to a different type of data stores which may have different performance characteristics than the set of data stores 230. Thus, it is understood that the data plane may provide various types of data stores and in some embodiments, respective data stores from each of the set of data stores 230 and set of data stores 232 may be provisioned in order to support a given application workload.

Figure 3A:
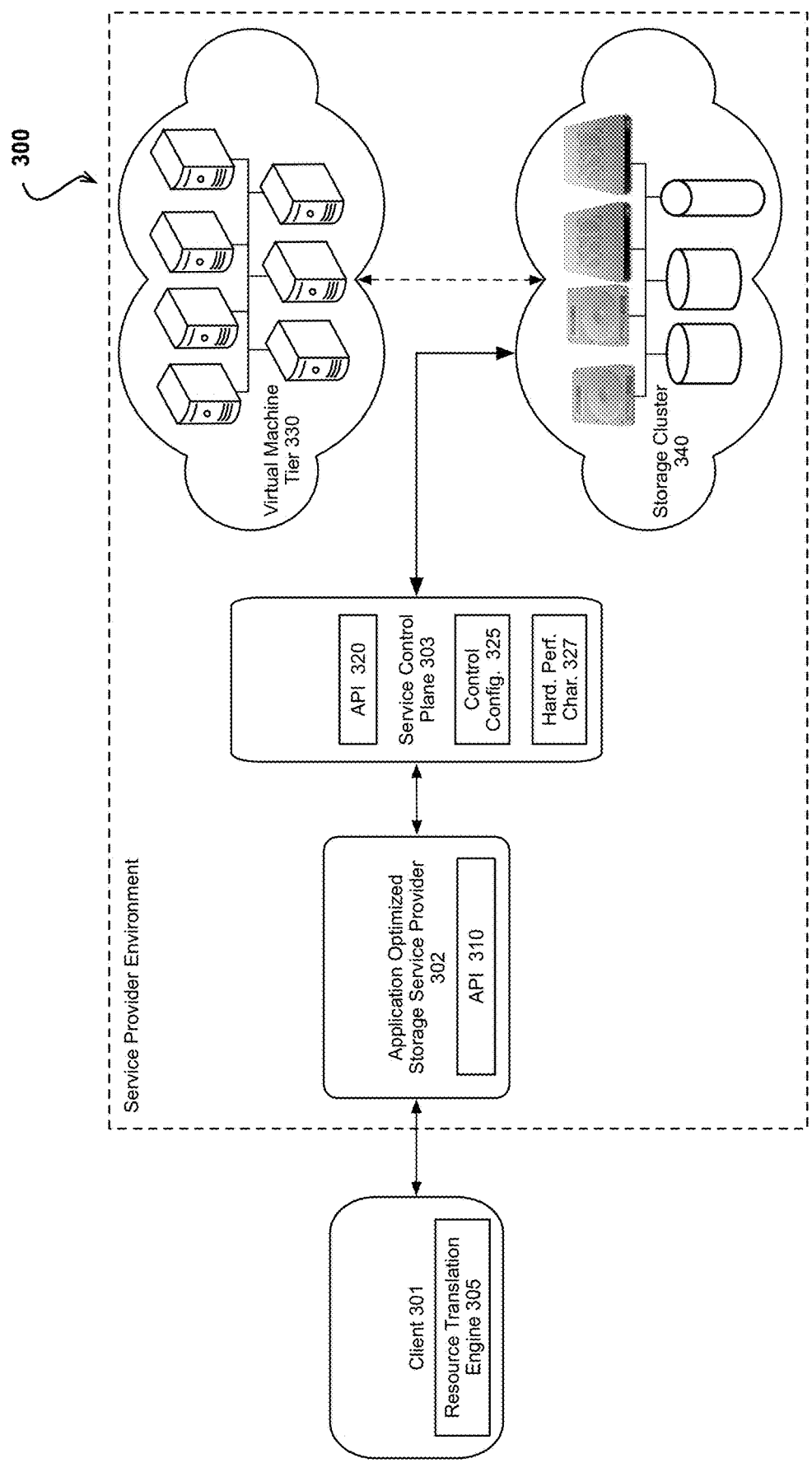
FIG. 3A illustrates an example of the various components of an application optimized storage service system in accordance with various embodiments.
Figure 3B:
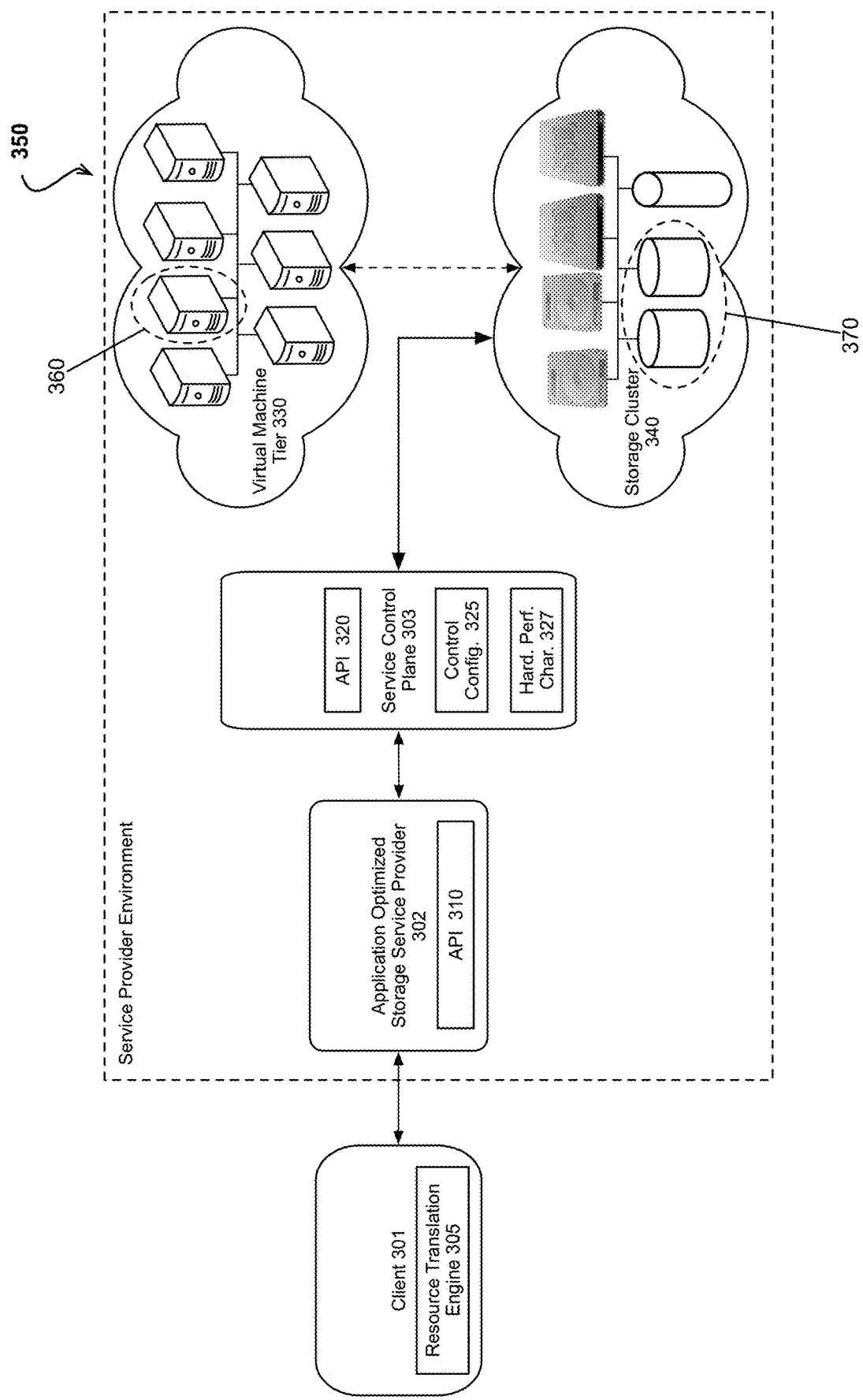
FIG. 3B illustrates an example of the various components of an application optimized storage service system that have been selected for provisioning in accordance with various embodiments.

In some embodiments, for provisioning the set of data stores to the application, information related to a virtual mount point 225 may be provided to the client 201 to enable access to the set of data stores. In one embodiment, a virtual mount point may be conceptually understood as a logical structure associated with a set of data stores that enables access to the set of data stores from a single location (e.g., the virtual mount point) even if the data stores are located across separate physical storage devices. Therefore, instead of accessing the data stores individually in the case of several data stores, the client 201 or application may access the virtual mount point 225 to perform operations and access the storage resources (among others) provided by the data stores. In some embodiments, the virtual mount point 225 may be provided via a host virtual machine from a virtual machine tier (e.g., as shown in FIGS. 3A and 3B). The application optimized storage service system 210 may then provide the virtual mount point 225 to the client 201 for provisioning the set of data stores 230 to the application. As further shown, another virtual mount point 225 may also be provided in a similar manner for provisioning the set of data stores 232 to an application. In some cases, it is appreciated that the virtual mount point 225 may be provided for provisioning respective data stores from the set of data stores 230 and the set of data stores 232.

FIG. 3A illustrates an example of the various components of an application optimized storage service system 300 in accordance with various embodiments. As illustrated, a client 301 (e.g., an application provider or vendor) includes a resource translation engine 305, which is a software component in one example, that interacts with an API 310 provided by an application optimized storage service provider 302. The application optimized storage service provider 302 may provide a set of hardware components (e.g., processor, memory, disk, etc.) to support the API 310. As illustrated, a service provider environment may include the application optimized storage service provider 302, a service control plane 303, a virtual machine tier 330 and a storage cluster 340. In some embodiments, the application optimized storage service provider 302 provides an API layer in the form of the API 310 that enables one or more clients such as the client 301 to make API calls (e.g., in a form of requests, etc.) to request a configuration of data storage for supporting a workload of an application.

For instance, the resource translation engine 305 sends a request (e.g., in the form of an API call) to the API 310 to request the configuration of data storage. The request, in some examples, may include software configuration data for configuring data storage for supporting a workload of an application. Responsive to this request, a software component supporting the API 310 may make an API call to an API 320 (which is not exposed to the client 301 in some embodiments) provided by the service control plane 303 for determining a set of hardware performance characteristics for supporting the workload of the application based at least in part on the software configuration data. In one example, as mentioned before, the request may include a name and/or version of the software application. The API 320 may communicate with a control configuration module 325 to query for an existing or prior storage application settings stored locally or remotely, the existing application settings providing information regarding a set of storage resources that support the workload of the application corresponding to prior or existing provisioned data stores that utilize a respective set of physical storage devices from the storage cluster 340. Based on the storage application settings, a respective set of physical storage devices may be provisioned to support the application workload.

The service control plane 303 may also communicate with a set of computing devices or servers that manage storage resources (e.g., physical storage devices) provided in the storage cluster 340. In this regard, in response to the request, a software component supporting the API 320 may determine a current set of available hardware resources that match the set of hardware performance characteristics from the storage cluster 340. For instance, each physical storage device from the storage cluster 340 includes a respective set of hardware performance characteristics based on available hardware resources that may be updated, periodically, by the service control plane 303 and stored in hardware performance characteristics 327. By way of example, a physical storage device that is currently allocated to many applications may have fewer available resources, while a separate physical storage device that is allocated to fewer applications may have more available resources. As shown, it is appreciated that the storage cluster 340 may include different types of physical storage devices such as, but not limited to, hard disks, solid state disks, flash drives, etc., each with respective hardware performance characteristics.

Using the current set of available hardware resources from the storage cluster 340 as determined from the hardware performance characteristics 327, the service control plane 303 provisions or launches a set of data stores. In this regard, the service control plane 303 may select one or more respective physical storage devices from the storage cluster 340 that match, individually or in aggregate, the hardware performance characteristics for supporting the application workload as further illustrated in FIG. 3B.

FIG. 3B illustrates an example of the various components of an application optimized storage service system 350 that have been selected for provisioning in accordance with various embodiments. The components of the application optimized storage service system 350 are the same as those described in FIG. 3A.

As illustrated, using the current set of available hardware resources from the storage cluster 340 as determined from the hardware performance characteristics 327 discussed before, the service control plane 303 provisions or launches a set of data stores. As discussed before, the service control plane 303 may select one or more respective physical storage devices from the storage cluster 340 that match, individually or in aggregate, the hardware performance characteristics for supporting the application workload. In the example of FIG. 3B, a set of physical storage devices 370 has been selected upon a determination that the available resources of the set of physical storage devices 370 match the hardware performance characteristics that support the application workload.

After provisioning the data stores, the service control plane 303, in some embodiments, sends a request to the virtual machine tier 330 to provide a virtual mount point corresponding to the provisioned data stores. The virtual machine tier 330 may include a set of computing devices or servers that provides a host virtual machine on an individual computing device or server. In the example of FIG. 3B, a host virtual machine 360 has been selected to serve as the host to the virtual mount point that enables access to the provisioned data stores. The host virtual machine 360 receives each network address (e.g., IP address) of each of the data stores that provide the storage capacity or resources provisioned to the application, and generates the virtual mount point based on these network addresses. A communication channel therefore may be established between the host virtual machine 360 from the virtual machine tier 330 and the set of data stores that are launched using set of physical storage devices 370 from the storage cluster 340.

Information related to the virtual mount point may be provided to the client 301 for provisioning the set of data stores to the application. In this regard, the service control plane may send this information to the application optimized storage service provider 302, which in turns sends the information to the client 301. Based on the information, the application may then access the virtual mount point provided by the host virtual machine 360 from the virtual machine tier 330 to access the provisioned data stores from the storage cluster 340. Thus, after provisioning the data stores based on the software configuration data provided in the initial request from the client 301, it should be understood that subsequent access to the data stores by the application does not occur via the service control plane 303.

Figure 4:
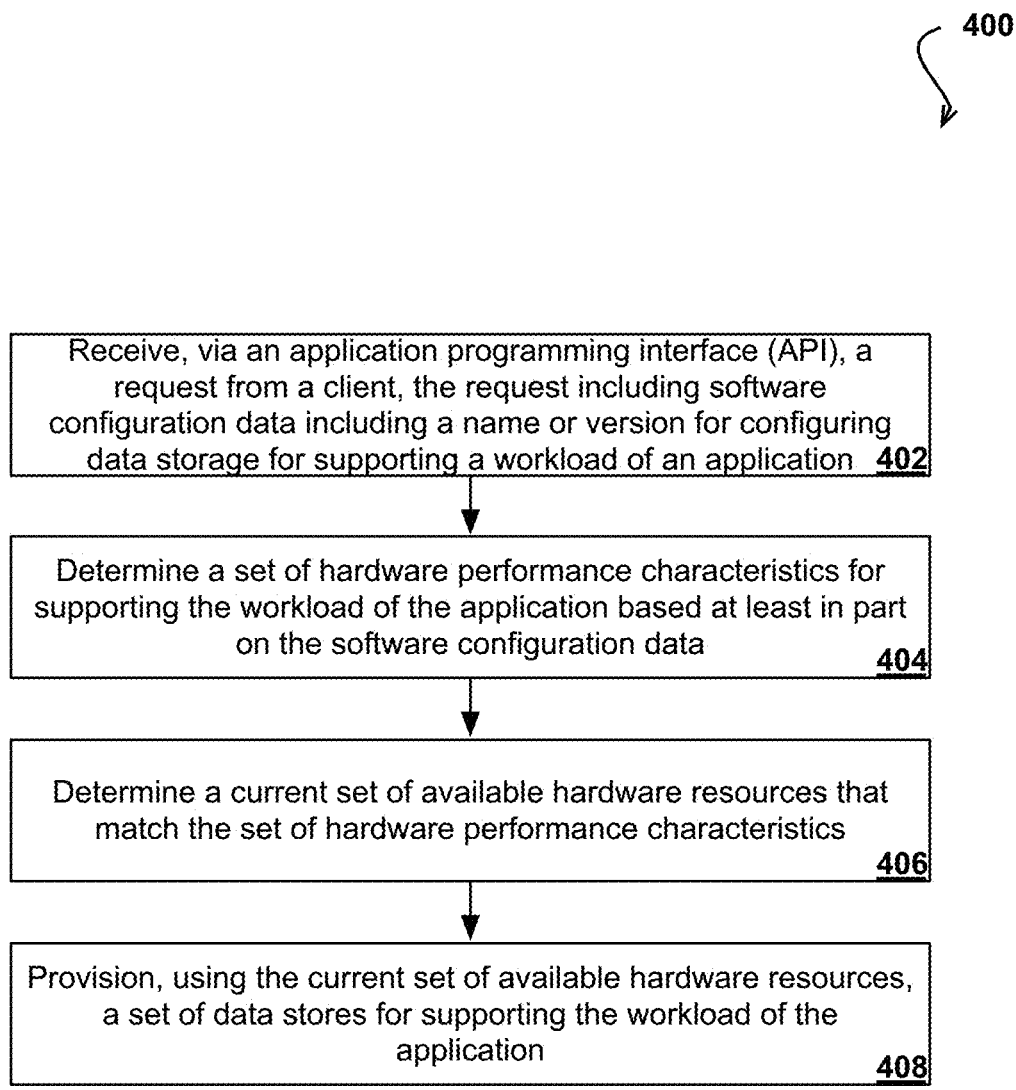
FIG. 4 illustrates an example process for provisioning a set of data stores for supporting the workload of the application that can be used in accordance with various embodiments.

FIG. 4 illustrates an example process 400 for provisioning a set of data stores for supporting the workload of the application that can be used in accordance with various embodiments. Although this figure, as well as other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments. The process 400 may be implemented by one or more computing devices or systems in some embodiments.

At step 402, a request, via an application programming interface (API), is received from a client. The request includes software configuration data for configuring data storage for supporting a workload of an application in some examples. As discussed before, the software configuration data includes at least a name and/or version number of an application, or computing resource requirements that support the workload of the application, and the computing resource requirements may include information indicating a number of operations over a period of time, an amount of latency per operation or an amount of storage space that supports the workload of the application, etc.

At step 404, a set of hardware performance characteristics is determined for supporting the workload of the application based at least in part on the software configuration data. In some embodiments, the hardware performance characteristics may represent a minimum or maximum unit of work that is required by the application. By way of an example, a given application may require a specific size of data (e.g., 4k, 8k, etc.) for each request which may represent a minimum unit of work for the application. Further, the application may require a specific amount of CPU or processor compute time for each write operation, such as a time for coalescing a write operation, preparing the write for output to a storage stack of a kernel and subsequently connecting the output to the storage mount point. In another example, the application may request a specific amount of I/O operations per second (IOPs) that consumes an amount of network bandwidth. Thus, a maximum unit of work that nearly exhausts CPU processing time and/or network bandwidth may be determined according the CPU compute time for each write operation or the amount of requested IOPS in such examples. By including the name and/or version of the application, the subject technology may be able to discern hardware performance characteristics of storage configurations that satisfy the unit of work for the application. At step 406, a current set of available hardware resources that match the set of hardware performance characteristics is determined. The available hardware resources include one or more physical storage devices and each physical storage device includes a respective set of hardware performance characteristics based on available hardware resources. In some embodiments, measuring hardware performance characteristics based on available hardware resources of each physical storage device is performed to match the set of hardware performance characteristics. At step 408, using the current set of available hardware resources, a set of data stores is provisioned for supporting the workload of the application.

Figure 5:
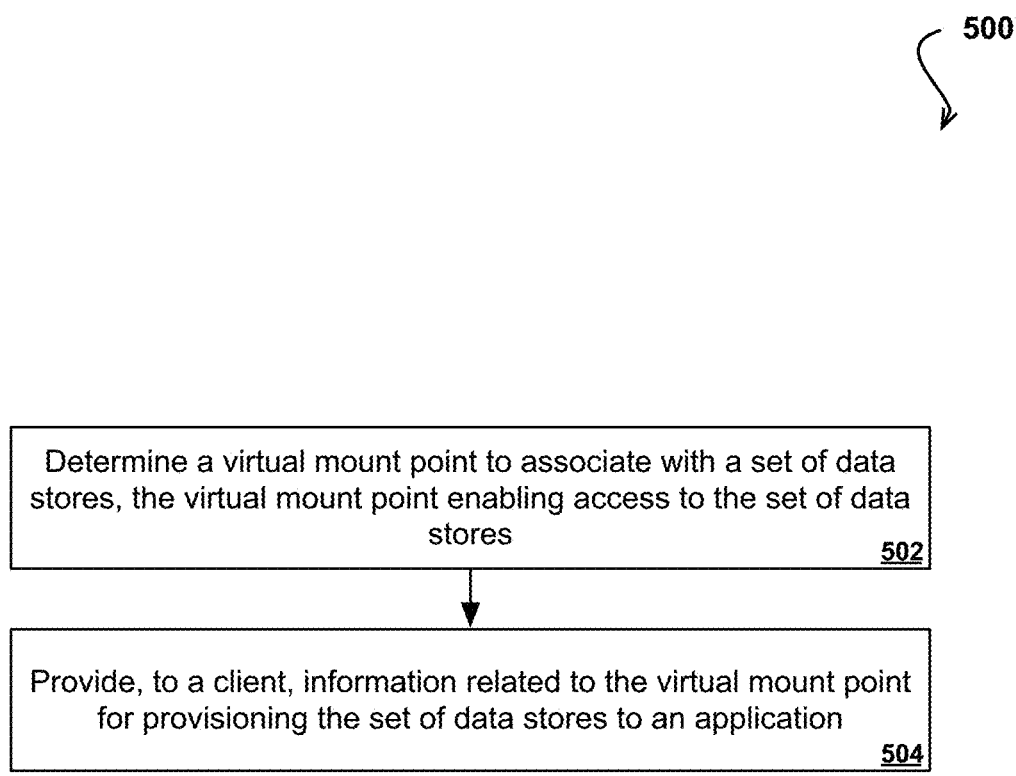
FIG. 5 illustrates an example process for providing a virtual mount point for a set of data stores that can be utilized in accordance with various embodiments.

FIG. 5 illustrates an example process 500 for providing a virtual mount point for a set of data stores that can be utilized in accordance with various embodiments. The process 500 may be implemented by one or more computing devices or systems in some embodiments. Additionally, the process 500 may be performed in conjunction with the process 400 described in FIG. 4. More specifically the process 500 may be performed after the step 408 of the process 400.

At step 502, a virtual mount point is determined to associate with a set of data stores. As discussed before, the virtual mount point enables access to the set of data stores. The virtual mount point is associated with a set of network addresses, and each network address respectively corresponds to a network location of a data store from the set of data stores in some embodiments. At step 504, information related to the virtual mount point is provided to a client for provisioning the set of data stores to the application. In this fashion, the application may then utilize the information related to the virtual mount point to access the provisioned set of data stores.

Figure 6:
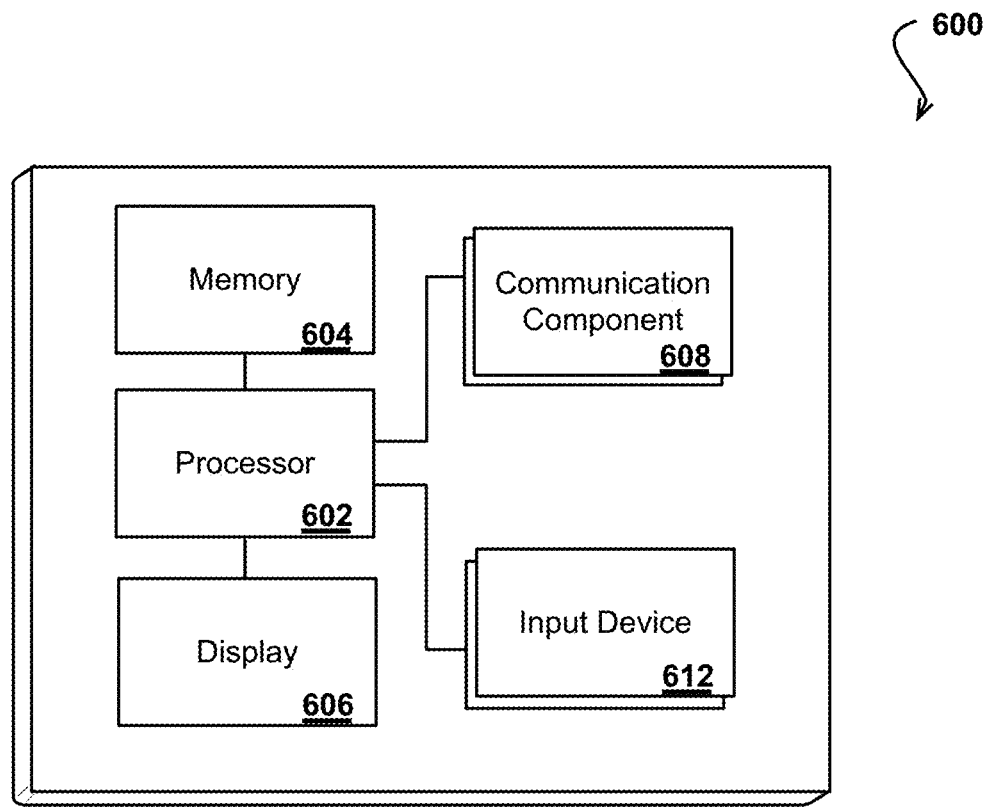
FIG. 6 illustrates example components of a client computing device in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 612 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more communication components 608, such as a Wi-Fi, Bluetooth, RF, wired, or wireless communication system. The device in many embodiments can communicate with a network, such as the Internet, and may be able to communicate with other such devices.

Figure 7:
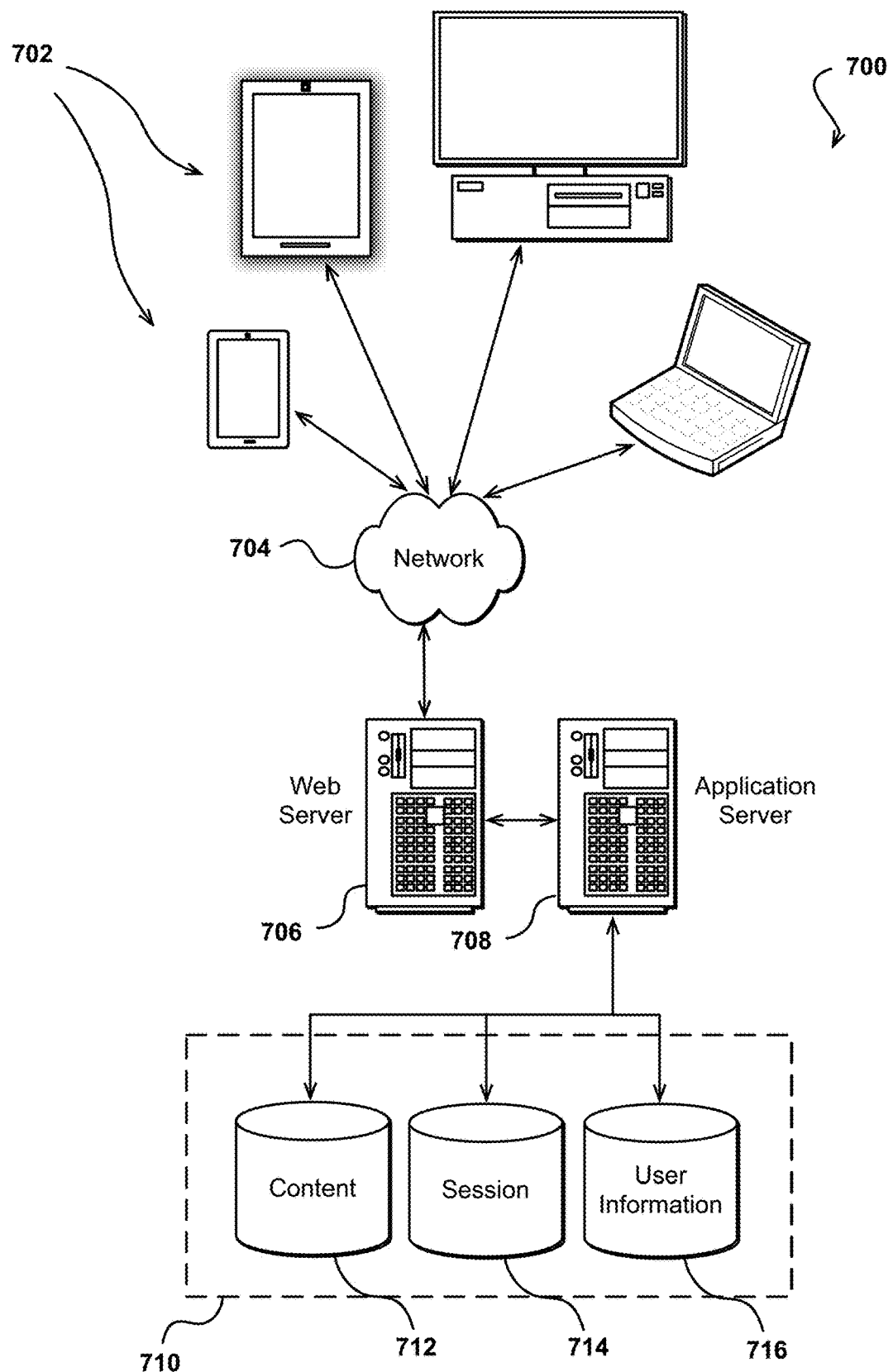
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A system, comprising:
at least one processor; and
a memory device including instructions that, when executed by the at least one processor, cause the system to:
receive, via a first application programming interface (API), a request from a client, the request for configuring data storage for supporting a workload of an application, the request specifying at least one of a name of the application or a version of the application;
obtain, via a second API on a service control plane and based at least in part on the request, a set of software performance characteristics for the application determined using at least one of the request, or data from prior execution of the application, or the version of the application, the set of software performance characteristics including at least one of an amount of latency per operation, a rate of file transfer, a rate of received requests, or an amount of storage space corresponding to desired performance of the application;
translate the set of software performance characteristics into a set of hardware performance characteristics for supporting the workload of the application;
determine a set of available hardware resources satisfying at least one hardware performance characteristic of the set of hardware performance characteristics, wherein the set of available hardware resources includes one or more physical storage devices associated with the set of available hardware resources, and wherein the one or more physical storage devices have the at least one hardware performance characteristic of the set of hardware performance characteristics;
provision, using the one or more physical storage devices, a set of data stores for supporting the workload of the application;

determine a virtual mount point to associate with the set of data stores, the virtual mount point enabling access to the set of data stores; and provide, to the client, information related to the virtual mount point for provisioning the set of data stores to the application.

2. The system of claim 1, wherein the set of software performance characteristics further include a number of operations over a period of time, and wherein the instructions when executed further cause the system to:

determine the set of software performance characteristics.

3. The system of claim 1, wherein the instructions when executed further cause the system to:

measure at least one hardware performance characteristic of a selected subset of the set of hardware performance characteristics for physical storage devices associated with a set of available hardware resources, the selected subset of the set of hardware performance characteristics including an interface speed, an access latency, an access time, a seek time, an input/output (I/O) block size, a multi-block I/O aggregated operation size, a write/read I/O ratio, a write/read throughput ratio, a ratio of throughput to I/O, a ratio of capacity to I/O, a throughput, a level of internal redundancy, an expected ratio of sequential to random operation, or a level of integrated write or read cache.

4. The system of claim 1, wherein the one or more physical storage devices include at least two physical storage devices, and wherein the at least two physical storage devices are associated with at least two different types of physical storage devices having different hardware performance characteristics.

5. The system of claim 4, wherein the virtual mount point enables access to the at least two different types of physical storage devices.

6. The system of claim 1, wherein the set of software performance characteristics is calculated based on observed performance or for optimal performance of the application.

7. A computer-implemented method comprising:

receiving, via a first application programming interface (API), a request for supporting a workload of an application, the request specifying at least one of a name of the application or a version of the application;

obtaining, via a second API on a service control plane and based at least in part on the request, a set of software performance characteristics for the application determined using at least one of the request or data from prior execution of the application, the set of software performance characteristics including at least one of an amount of latency per operation, a rate of file transfer, a rate of received requests, or an amount of storage space corresponding to desired performance of the application;

translating the set of software performance characteristics into a set of hardware performance characteristics for supporting the workload of the application;

determining a subset of available hardware resources satisfying the set of hardware performance characteristics, wherein the subset of the available hardware resources includes one or more physical storage devices associated with the subset of available hardware resources, and wherein the one or more physical storage devices have the set of hardware performance characteristics; and allocating, using the one or more physical storage devices, a data store for supporting the workload of the application.

8. The computer-implemented method of claim 7, wherein the set of software performance characteristics further include a number of operations over a period of time, and wherein the computer-implemented method further comprises:

obtaining performance data for the prior execution of the application; and determining the set of software performance characteristics.

9. The computer-implemented method of claim 5, further comprising:

measuring at least one hardware performance characteristic of a selected subset of the set of hardware performance characteristics for physical storage devices associated with a set of available hardware resources, the selected subset of the set of hardware performance characteristics including an interface speed, an access latency, an access time, a seek time, an input/output (I/O) block size, a multi-block I/O aggregated operation size, a write/read I/O ratio, a write/read throughput ratio, a ratio of throughput to I/O, a ratio of capacity to I/O, a throughput, a level of internal redundancy, an expected ratio of sequential to random operation, or a level of integrated write or read cache.

10. The computer-implemented method of claim 7, further comprising:

determining a virtual mount point to associate with the data store, the virtual mount point enabling access to the data store; and providing, to a client, information related to the virtual mount point for provisioning the data store to the application.

11. The computer-implemented method of claim 7, wherein the one or more physical storage devices include at least two physical storage devices, and wherein the at least two physical storage devices are associated with at least two different types of physical storage devices having different hardware performance characteristics.

12. The computer-implemented method of claim 11, wherein a virtual mount point enables access to the at least two different types of physical storage devices.

13. The computer-implemented method of claim 7, wherein the set of software performance characteristics is calculated based on observed performance or for optimal performance of the application.

14. A non-transitory computer-readable medium including instructions stored therein that, when executed by at least one computing device, cause the at least one computing device to:

receive, via a first application programming interface (API), a request for supporting a workload of an application, the request specifying at least one of a name of the application or a version of the application;

obtain, via a second API on a service control plane and based at least in part on the request, a set of software performance characteristics for the application determined using at least one of the request or data from prior execution of the application, the set of software performance characteristics including at least one of an amount of latency per operation, a rate of file transfer, a rate of received requests, or an amount of storage space corresponding to desired performance of the application;

translate the set of software performance characteristics into a set of hardware performance characteristics for supporting the workload of the application;

determine a subset of available hardware resources satisfying the set of hardware performance characteristics, wherein the subset of the available hardware resources includes one or more physical storage devices associated with the subset of available hardware resources, and wherein the one or more physical storage devices have the set of hardware performance characteristics; and allocate, using the one or more physical storage devices, a data store for supporting the workload of the application.

15. The non-transitory computer-readable medium of claim 14, wherein the set of software performance characteristics further include a number of operations over a period of time, and wherein the instructions when executed further cause the at least one computing device to:

obtain performance data for the prior execution of the application; and determine the set of software performance characteristics.

16. The non-transitory computer-readable medium of claim 14, wherein the instructions when executed further cause the at least one computing device to:

measure at least one hardware performance characteristic of a selected subset of the set of hardware performance characteristics for physical storage devices associated with a set of available hardware resources, the selected subset of the set of hardware performance characteristics including an interface speed, an access latency, an access time, a seek time, an input/output (I/O) block size, a multi-block I/O aggregated operation size, a write/read I/O ratio, a write/read throughput ratio, a ratio of throughput to I/O, a ratio of capacity to I/O, a throughput, a level of internal redundancy, an expected ratio of sequential to random operation, or a level of integrated write or read cache.

17. The non-transitory computer-readable medium of claim 14, wherein the instructions when executed further cause the at least one computing device to:

determine a virtual mount point to associate with the data store, the virtual mount point enabling access to the data store; and provide, to a client, information related to the virtual mount point for provisioning the data store to the application.

18. The non-transitory computer-readable medium of claim 14, wherein the one or more physical storage devices include at least two physical storage devices, and wherein the at least two physical storage devices are associated with at least two different types of physical storage devices having different hardware performance characteristics.

19. The non-transitory computer-readable medium of claim 18, wherein a virtual mount point enables access to the at least two different types of physical storage devices.

20. The non-transitory computer-readable medium of claim 14, wherein the set of software performance characteristics is calculated based on observed performance or for optimal performance of the application.

\* \* \* \* \*